United States Patent [19]

Eldridge

[11] Patent Number: 4,539,773
[45] Date of Patent: Sep. 10, 1985

[54] FISHING LINE CHOKE FOR THE ROD OF A SPINNING REEL

[76] Inventor: Vernon F. Eldridge, 465 Chicopee Ave., Louisville, Ky. 40209

[21] Appl. No.: 636,952

[22] Filed: Aug. 2, 1984

[51] Int. Cl.³ ............................................. A01K 97/00
[52] U.S. Cl. ..................................................... 43/25
[58] Field of Search ...................... 43/25, 4, 18.1, 18.5

[56] References Cited

U.S. PATENT DOCUMENTS

| | | | |
|---|---|---|---|
| 2,791,858 | 5/1957 | Kernodle | 43/25 |
| 2,804,711 | 9/1957 | Kozar | 43/25 |
| 2,843,963 | 7/1958 | Butehorn | 43/25 |
| 3,045,380 | 7/1962 | Meredith | 43/25 |
| 3,643,367 | 2/1972 | Denny | 43/25 |
| 3,952,443 | 4/1976 | Kaminski | 43/25 |

*Primary Examiner*—Gene P. Crosby
*Attorney, Agent, or Firm*—Richard L. Caslin

[57] ABSTRACT

A thumb-operated fishing line choke accessory that may be installed to an existing fishing rod for choking the line when preparing to cast, as well as for choking the line after the cast has been made in order to accurately pinpoint the drop of the lure being cast. The device has a clamping member that is adapted to be fastened to the front end of the rod handle, a thumb-engaging actuator member that is pivotally connected to the clamping member, and a movable collar that is carried by the rod and acted upon by the actuator and serves as an anchor for one end of a pair of parallel wire members that are supported along the length of the rod. There is a combined fishing line ring guide and choke member mounted intermediate the length of the rod, and it has an inclined guide frame supporting a smooth ring guide through which the fishing line extends, as well as a movable choke member that is attached to the other end of the pair of wire members. The guide frame includes a resilient stop against which the fishing line is adapted to be forced by the choke member when the actuator member is operated.

6 Claims, 9 Drawing Figures

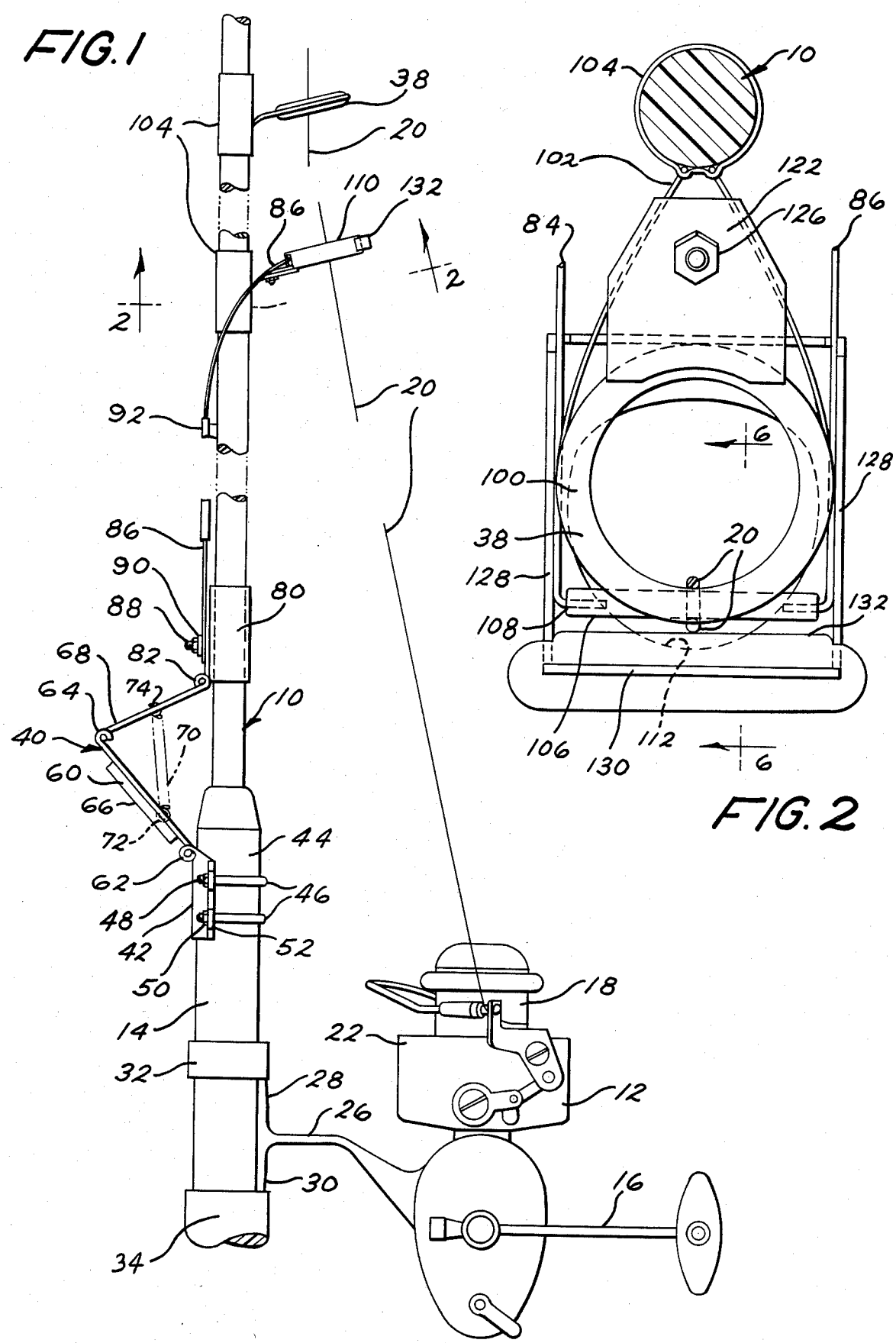

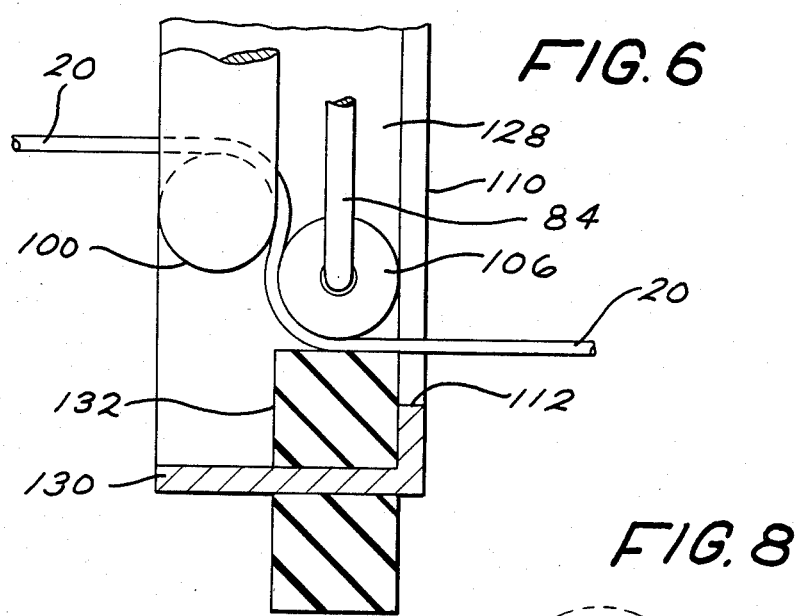
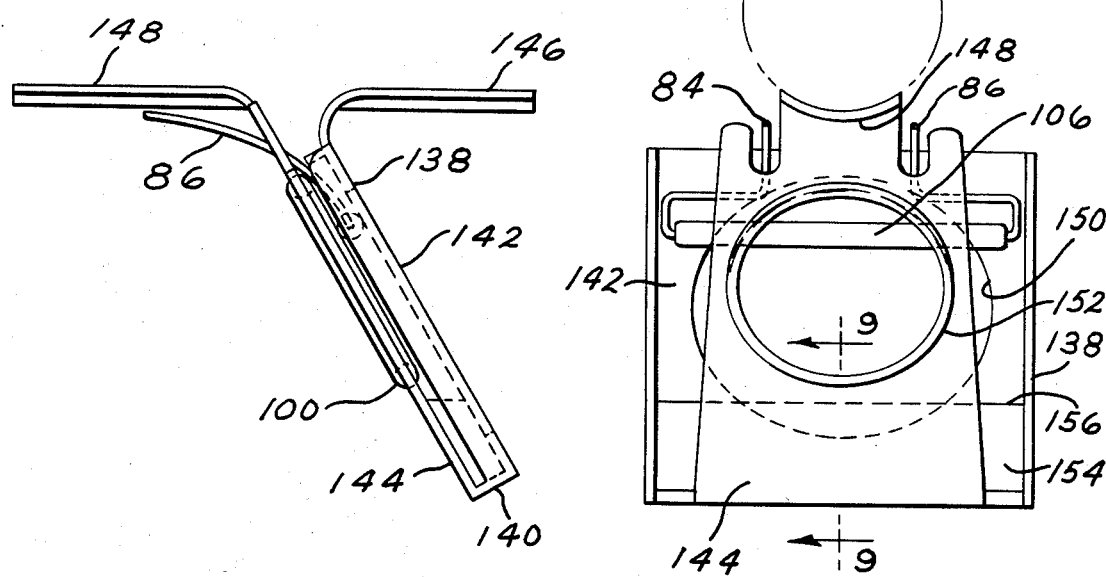
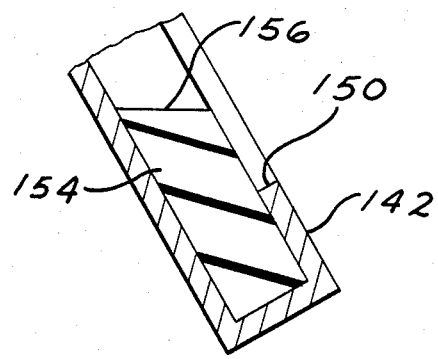

FISHING LINE CHOKE FOR THE ROD OF A SPINNING REEL

BACKGROUND OF THE INVENTION

1. Field of the Invention

This invention relates to the art of spinning reel control and release mechanisms for use on fishing rods having spinning reels for casting. In particular this invention relates to a thumb-operated fishing line choke that is installed on the handle of a fishing rod having a spinning reel attached to the rod for casting so that the invention is used for choking the fishing line so that the line may not move just prior to casting the rod forward to release the line and its lure allowing the line to unwind from the spinning reel.

2. Description of the Prior Art

The Kaminski U.S. Pat. No. 3,952,443 describes a fishing reel accessory to be mounted on the handle of a fishing pole where the accessory comprises a finger operated brake member that is adapted to engage the reel and prevent it from turning thereby preventing the unwinding of the line from the reel. This brake member has a spring-loaded thumb lever that is pivotally mounted at the handle. Accordingly, this accessory prevents the slipping of the fishing line during casting. This is not a fishing line choke per se, but it is a fishing reel brake.

The Denny et al U.S. Pat. No. 3,643,367 describes with many types of spinning reels, the practice of the fishing line being temporarily retained by looping a portion of the line extending from the spinning reel over the tip of the users index finger. Then, as the cast is made, the index finger is retracted at the appropriate time, so as to disengage the finger from the line to allow free unwinding of the line from the spinning reel, as the terminal line tackle or lure is projected toward the splash-down location. This Denny et al patent incorporates a housing mounted on top of the rod handle. This housing includes a spring-loaded thumb lever that includes a perpendicular latch pin. The line is looped around a V-shaped, smoothly rounded, recessed fairlead by the user's left hand, and then the line extends rearwardly and passes once around the latch pin, and then extends forwardly and downwardly in a linear reach toward and through the aftermost line guide. The fishing line is released by a slight movement of the thumb at the appropriate juncture in the casting operation.

The Meredith U.S. Pat. No. 3,045,380 describes a fishing line brake or choke for a spinning reel. There is a spring-loaded thumb lever that is mounted on top of the rod handle, and it acs upon line pincers having both pivoted handles and line grasping jaws, almost like a pair of pliers. This patent mentions the fact that the monofilament line is quite fragile, and that any mechanical device that touches this line must be delicate in its contact so as not to injure or weaken the line.

The Butehorn U.S. Pat. No. 2,843,963 describes a mechanical finger for controlling the line of a spinning fishing reel. This patent relates to a manually actuated release mechanism for permitting the fishing line to disengage from the mechanical finger during the casting of the lure without the necessity of having to directly hold the line with the users hand. This mechanical finger serves to hold the line as it is being cast so as to prevent slipping and pulling of the drag or the sinking of the line into the windings of the reel. There is a hollow housing mounted on the top of the rod handle and it supports a pivotally mounted mechanical finger assembly or latch supported upon a centrally located hinge pin. A U-shaped bail is pivotally supported upon the rear end of the housing and it serves as the locking means for a trigger or thumb plate. Notice there is no spring acting upon the latch. The fishing line is wound upwardly from the reel around the rear of the mechanical finger on the latch, then forwardly around the housing and into an indent at the forward end thereof and then rearwardly back and around the mechanical finger so as to extend forwardly toward the front end of the rod. Thus, it will be recognized that any forward pull on the line only tightens the engagement of the line with the housing so that no pull is exerted upon the line on the reel. The cast is then made in the same manner as with a conventional surf reel during which cast the thumb is lifted at the proper time from the thumb plate to permit the latch member to rotate to a released position, in which position the mechanical finger is disposed to fall open forwardly to permit the line to disengage from the mechanical finger and from the housing, whereupon the lure draws the line outwardly from the reel in a conventional manner.

OBJECTS OF THE PRESENT INVENTION

The principal object of the present invention is to provide a fishing line choke accessory for use with a rod having an open-face spinning reel, where the accessory is clamped to the handle of the rod, and extends along the length of the rod, and it has a combined fishing line ring guide and choke member in combination with a resilient stop so that the fishing line may be forced by the choke member against the stop.

A further object of the present invention is to provide a fishing line choke accessory of the class described with a thumb-engaging actuator member which acts upon a movable collar that is carried by the rod, where the collar serves as an anchor means for a pair of compression wire members that are fitted at the opposite end of the wire members with a choke member that operates within an inclined guide frame through which the fishing line extends.

A further object of the present invention is to provide a fishing line choke accessory of the class described where the guide frame is fitted with a resilient stop against which the fishing line is adapted to be forced by the choke member when the actuator member is operated.

SUMMARY OF THE INVENTION

The present invention provides a thumb-operated fishing line choke accessory that includes a first clamping member fastened to the rod handle, a thumb-engaging actuator member pivotally mounted to the clamping member, a movable collar carried by the rod and acted upon by the actuator and serving as an anchor means for one end of a compression strut means that is supported along the length of the rod and guided to move generally parallel thereto. There is a combined fishing line ring guide and choke member that is adapted to be fastened intermediate the length of the rod, and it includes an inclined guide frame supporting a smooth ring guide through which the fishing line extends, as well as a movable choke member that is supported on the other end of the compression strut means and is movable thereby. The guide frame includes a resilient stop against which the fishing line is adapted to be forced by the choke member when the actuator member is operating. There is a retractable spring means acting upon the actuator member to reset the actuator member when it is released by the user.

BRIEF DESCRIPTION OF THE DRAWINGS

This invention will be better understood from the following description taken in conjunction with the accompanying drawings, and its scope will be pointed out in the appended claims.

FIG. 1 is a fragmentary side elevational view of a fishing rod having an open-face spinning reel, where the rod is fitted with the thumb-operated fishing line choke accessory of the present invention, in its at-rest position.

FIG. 2 is a front elevational view, on an enlarged scale, with parts shown in cross section, of the combined fishing line ring guide and choke member of the present invention, taken on the line 2—2 of FIG. 1.

FIG. 6 is a fragmentary side elevational view of the lower portion of the combined fishing line ring guide and choke member of FIG. 4 showing the choke member forcing the fishing line against the resilient stop, which occurs when the actuator member is operated by the user.

FIG. 7 is a side elevational view of a second modification of the combined fishing line ring guide and choke member.

FIG. 8 is an elevational view of the second modification of the combined fishing line ring guide and choke member of FIG. 7 looking from the handle end of the rod toward the tip thereof.

FIG. 9 is a fragmentary cross-sectional elevational view, on an enlarged scale, taken on the line 9—9 of FIG. 8.

DESCRIPTION OF THE PREFERRED EMBODIMENTS

Figure 5:
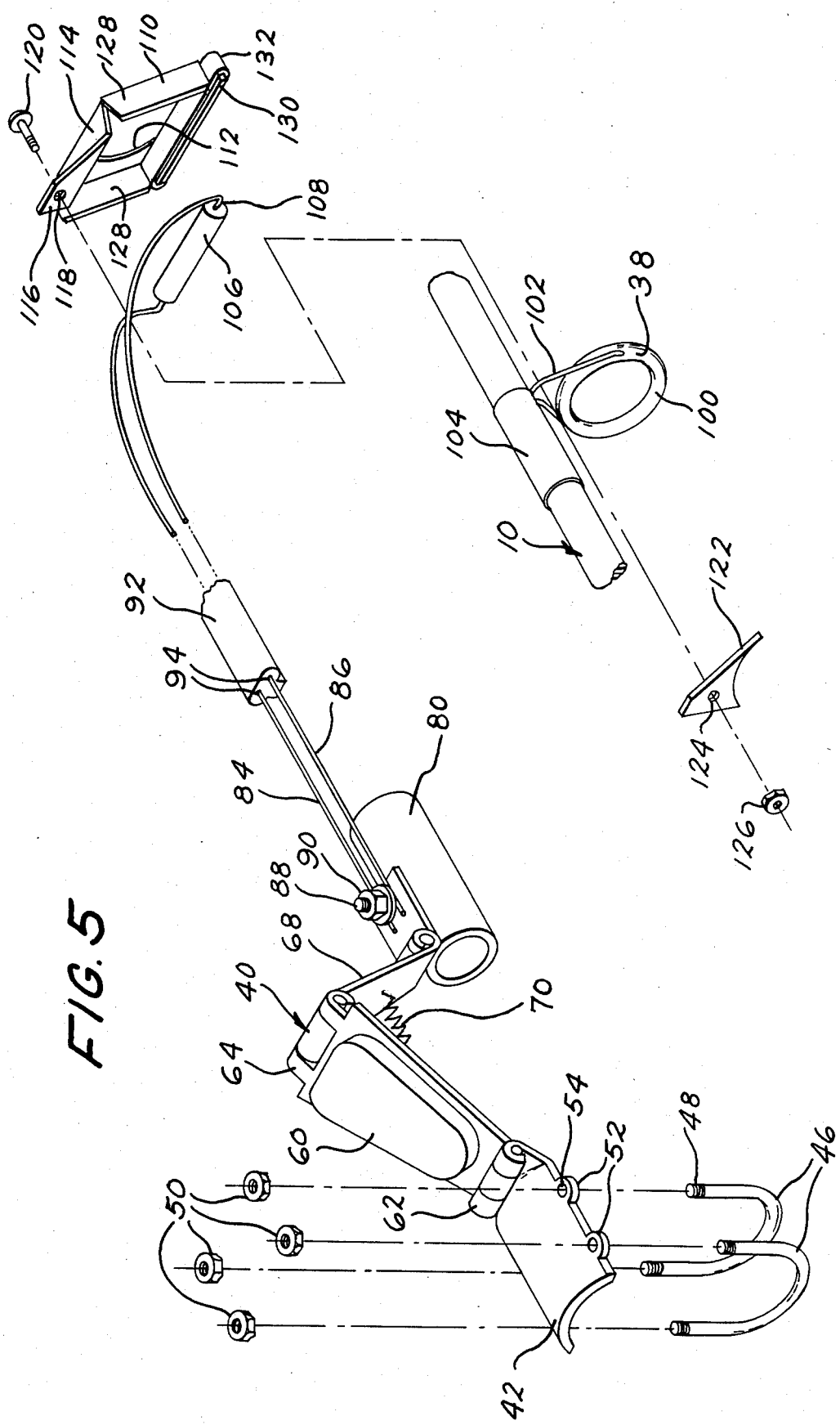
FIG. 5 is an exploded view of the fishing line choke accessory of the present invention, best showing the details of construction.

Turning now to a consideration of the drawings, and, in particular, to the fragmentary side elevational view of FIG. 1, there is shown a fishing rod 10 equipped with an open-face spinning reel 12 fastened beneath the handle 14 of the fishing rod, as is standard in this art. The reel 12 has a winding handle 16 for operating the reel. Other features of the reel are the spool 18 on which is wound the monofilament line 20, the rotating head 22, the line pick-up bail 24, mounting bracket 26 having a pair of feet 28 and 30 which are fastened to the handle 14 of the rod by means of a pair of adjustable ferrules 32 and 34 respectively, as is standard in this art. Another standard feature of this fishing rod 10 is a series of line guides 38 which are mounted along the length of the rod for receiving the line 20 therethrough, as seen in FIGS. 1 and 5.

Now to be explained is the thumb-operated fishing line choke accessory 40 which may be installed on an existing fishing rod or it may be added to the fishing rod during the manufacture thereof. The elements of this fishing line choke assembly 40 are best illustrated in the exploded perspective view of FIG. 5, but they will be described in detail starting first with FIG. 1. This fishing line choke accessory 40 has a clamping member 42 in the form of a curved saddle which is fastened to the front end 44 of the rod handle 14 by means of a pair of U-shaped bolts 46 which are threaded on their free ends 48 for receiving the fastening nuts 50 thereon. The saddle-shaped clamping member 42 has a pair of mounting ears 52, where each mounting ear has a hole 54 for receiving the free end 48 of the U-bolt therethrough. Of course, other means may be employed for attaching this clamping member 42 to the rod handle 14. This pair of mounting ears is on the two opposite sides thereof.

The fishing line choke accessory 40 of the present invention has a thumb-engaging actuator member 60 that is pivotally mounted to the clamping member 42 by means of a hinge connection 62. Intermediate the length of the actuator member 60 is a knee joint 64 which divides the actuator member into a thumb-engaging portion 66 and a pusher element 68. The actuator member 60 is shown buckled about its knee joint 64 and held in that position by a tension spring 70 that is positioned under the actuator member and connected between the thumb-engaging portion 66 at one end 72 and to the pusher element 68 at the other end 74. The function of this tension spring 70 is to normally hold the actuator member 60 in a non-operating position, always ready to be acted upon by the user's thumb, as is shown in sequence in FIGS. 3 and 4.

A movable collar 80 is assembled on the rod 10, and it is pivotally connected to the pusher element 68 of the actuator member 60 by means of the hinge joint 82, so that the operation of the actuator member 60 controls the position of the movable collar 80 on the rod 10. The purpose of the movable collar 80 is to serve as an anchor means for one end of a pair of generally parallel, compression struts or linear wire members 84 and 86, as is best seen in FIG. 5. These wire members are adapted to extend for about one-third of the length of the rod 10 and generally parallel to the top portion of the rod. A short anchor bolt 88 is located on the top of the collar 80, and it is fitted with washer and lock nut 90 for clamping down on the ends of the two wires 84 and 86, as best seen in FIG. 5. These two linear wire members 84 and 86 serve as compression strut members, so that it is important that they not buckle when they are called upon to serve their function. Thus, the top portion of the rod 10 is furnished with a double elongated sheath 92 of lightweight plastic material which is fastened to the rod and has a pair of narrow gauge bores 94 running longitudinally thereof to receive the respective wires 84 and 86 therethrough. The overall length of this sheath 92 may be as much as 90 percent of the overall length of the pair of wire members 84 and 86. It will be recognized by those skilled in this art that this double sheath 92 could be replaced by a pair of individual plastic straw-like members or tubes which would serve the same purpose as the double elongated sheath 92.

As is standard in this art, the fishing rod 10 is provided with a plurality of longitudinally-spaced fishing line ring guides 38, one of which is shown in FIG. 5. This line guide 38 comprises a smooth-surfaced ring member 100 that is set at a slightly inclined angle, on the order of 15 degrees with respect to a perpendicular line coming from the rod 10. The ring member is furnished with a pair of wire braces 102 which terminate in a single foot (not shown) which extends longitudinally of the rod 10 and is held thereto by means of a thread wrap 104, as is conventional in this art. Of course, other means may be employed for anchoring the ring member 100 to the rod 10. In the preferred embodiment of the present invention, the nearest line guide 38 to the rod handle 14 is employed as the mounting means for the fishing line choke 106 of the present invention. This choke 106 is a thin, roller-like member having a small hole 108 in each end for receiving the end of one of the linear wire members 84 and 86 respectively. This choke 106 is positioned beneath the rod 10 and generally transverse to the longitudinal axis of the rod and on the front side of the ring member 100. An open sheet metal frame 110 is provided to cooperate with the ring member 100 and the movable choke 106 for guiding the movement of the choke between its raised position of FIG. 3 and its lowered choke position of FIGS. 4, 2 and 6. This choke guide frame member 110 is formed of a flat sheet of thin metal and then folded into its final shape. It has an enlarged port 112 that is generally larger than the interior periphery of the ring member 100. This frame also has a top flange 114 with a turned-up vertical flange 116 that includes a hole 118 for receiving a fastening screw 120. A flat clamping plate 122, as seen in both FIGS. 2 and 5, is positioned on the opposite side of the ring member 100 from the frame 110, and this plate also has a hole 124 for receiving the fastening screw 120 therethrough, and the screw is furnished with a lock nut 126. The choke guide frame 110 also has a pair of side flanges 128 and a bottom flange 130.

FIG. 2 is an enlarged elevational view of the combined fishing line ring guide and choke member of the present invention, on an enlarged scale, and it is taken on the Line 2—2 of FIG. 1. The bottom flange 130 of the choke guide frame 110 is furnished with a resilient stop 132, which is in the form of a heavy-duty rubber band which slips over, as well as under, the bottom flange 130, as is best seen in FIG. 2. Thus, this rubber band 132 is easy to assemble and replace, as well as it is easy to adjust its position which may be necessary after prolonged use because the fishing line 20 tends to cut through the rubber band 132 in the event the line choke accessory is used for line twist removal, as on an occasional retrieve of the line.

FIG. 6 is a cross-sectional elevational view, on an enlarged scale, taken on the Line 6—6 of FIG. 2.

Figure 3:
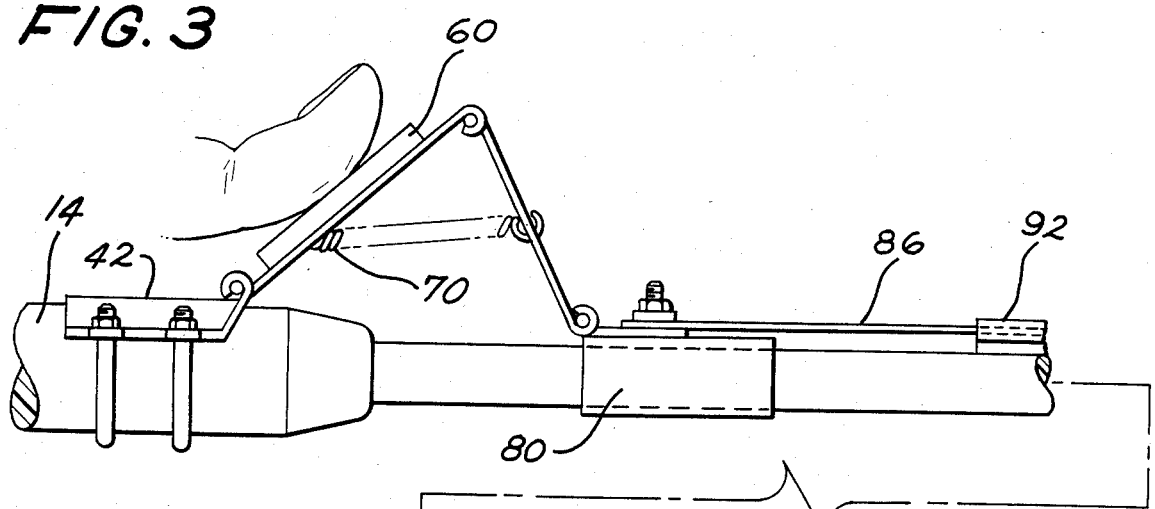
FIG. 3 is a side elevational view, similar to that of FIG. 1, but showing more details of the combined fishing line ring guide and choke member shown in cross section with the fishing line extending therethrough.
Figure 4:
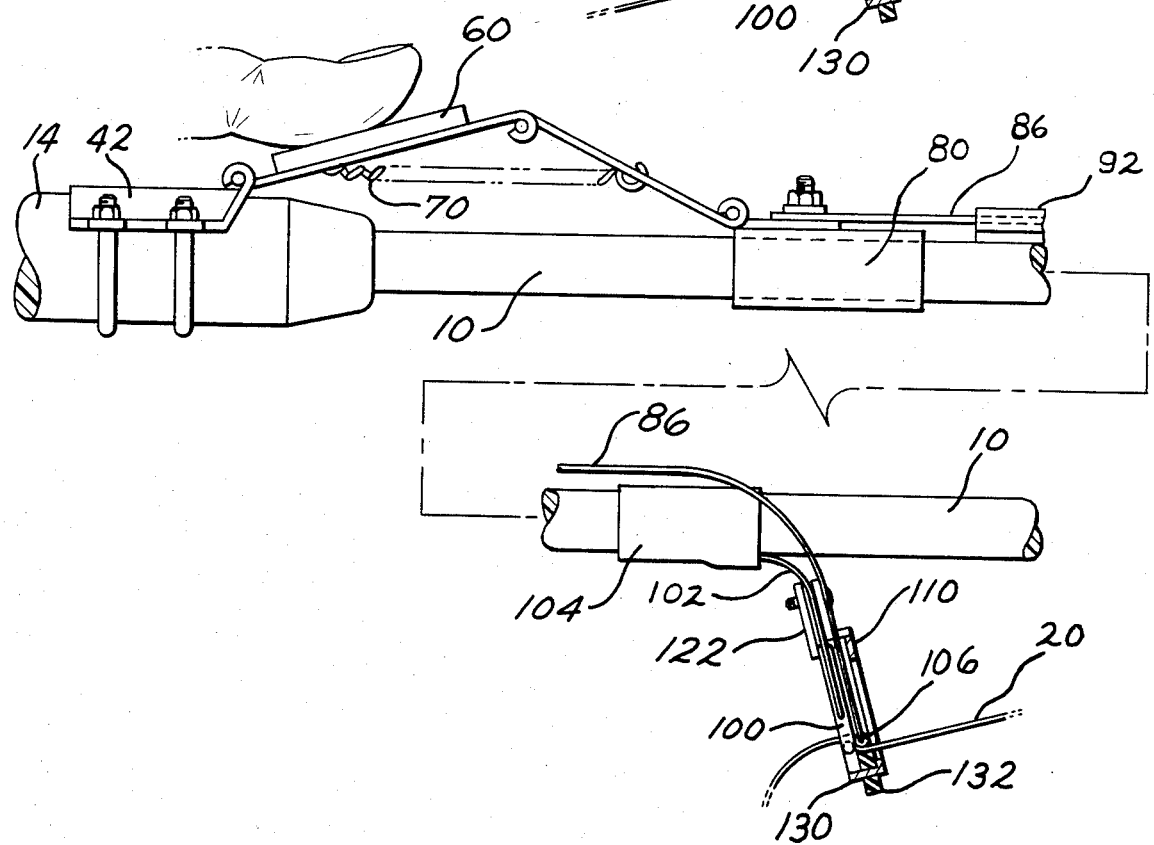
FIG. 4 is a side elevational view, similar to that of FIG. 3, but showing the actuator member depressed by the thumb, as well as showing the choke member in its lowered position with the fishing line forced against a resilient stop in the lower portion of the guide frame.

Turning to a consideration of the comparison views of FIGS. 3 and 4, FIG. 3 shows the relative position of the thumb-engaging actuator member 60 and the choke member 106, where the choke member is in its raised position when the actuator member 60 is not being depressed. When the user wishes to choke the line 20, he forces his thumb against the actuator member 60 which causes the movable collar 80 to slide along the rod 10, thereby forcing the pair of wire members 84 and 86 to move bodily along the length of the rod, thereby forcing the choke member 106 to descend until finally it squeezes the fishing line 20 against the resilient stop, as seen in FIGS. 4, 2 and 6. If the user's thumb 134 is raised in FIG. 4 from the actuator member 60, then the tension spring 70 will return the movable collar 80 to the position shown in FIG. 3, and, at the same time, raise the choke member 106 to its position as shown in FIG. 3.

As mentioned earlier, FIGS. 7-9 show a second modification of the combined fishing line ring guide and choke member of FIG. 5. In this second modification, a standard line guide 38 is not employed. This second modification is more of a heavy-duty design for use when fishing for larger size fish. In this second modification, there is a smooth-surfaced ring member 100, but it is not directly supported from the rod 10, but instead is built into a folded sheet metal choke guide frame 138 which is stamped of flat sheet material and then folded transversely adjacent its center, as at 140, to form a front side 142 and a rear side 144. The top portion of both the front side 142 and the rear side 144 is furnished with a mounting foot 146 and 148 respectively that is adapted to engage the underside of the rod 10 and to be fastened thereto by means of the thread wrap 104, as shown, for example, in FIG. 5. There is an enlarged port 150 in the front side 142 and a smaller port 152 in the rear wall 144. The smooth-surfaced ring member 100 is fastened in the smaller port 152, and the choke member 106 is positioned between the front side 142 and the rear side 144 of the frame member 138. The bottom portion of the frame member is fitted with a resilient stop 154 which has a top surface 156 that extends above the lowest reach of the enlarged port 150 in the front side of the frame, as best seen in FIG. 9.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed:

1. A thumb operated fishing line choke accessory for use with a rod having an open-face spinning reel supported adjacent a handle of the rod, said accessory comprising:
   a. a first clamping member adapted to be fastened adjacent the front end of the rod handle;
   b. a thumb-engaging actuator member pivotally mounted to the said clamping member,
   c. a movable collar adapted to be carried by the rod and acted upon by the said actuator as well as serving as an anchor means for one end of a compression strut means that is supported along the length of the rod and guided to move generally parallel thereto,
   d. and a combined fishing line ring guide and choke arrangement adapted to be fastened intermediate the length of the rod, said guide and choke arrangement comprising an inclined guide frame supporting a smooth ring guide through which a fishing line extends and a movable choke member that is attached to the other end of the said compression strut means and is movable thereby, the guide frame including a resilient stop against which the said fishing line is adapted to be forced by the said choke member when the said actuator member is operated by the user;
   e. and retractable spring means acting upon the said actuator member to reset the actuator member when it is released by the user.

2. The invention as recited in claim 1 wherein the said actuator member is pivotally connected at one end that is opposite the said clamping member to the said movable collar, and the intermediate portion of the actuator member has a transverse hinge joint, and the said retractable spring means is a tension spring working between the hinged halves of the actuator member tending to shorten the effective length of the actuator member.

3. The invention as recited in claim 2 wherein the said compression strut means comprised a pair of generally parallel linear wire members which are fastened at one end to the said movable collar and fastened at their other end to the said movable choke member, the intermediate portion of the said wire members being confined for sliding action within a double elongated sheath that is adapted to be fastened to the rod along the length thereof.

4. The invention as recited in claim 3 wherein the said choke member is an elongated roller which is supported from its opposite ends along its longitudinal centerline by the adjacent ends of said pair of wire members, the choke member being in a raised position within its guide frame when the actuator member is in a normal at-rest position, and being in a lowered position within its guide frame when the actuator is operated to choke the line.

5. The invention as recited in claim 4 wherein the said guide frame is adapted to be attached to an existing ring guide that is attached to the rod, where the choke member is confined to move between the ring guide and the guide frame.

6. The invention as recited in claim 4 wherein the said inclined guide frame includes a built-in ring guide having smooth surfaces on its inner periphery for possible engagement by the fishing line, the top portion of the guide frame having oppositely extending foot portions to be attached to the underside of the rod.

* * * * *